(Model.)
H. G. CARNELL.
GRIP FOR ICE SHAVERS.
No. 320,624. Patented June 23, 1885.
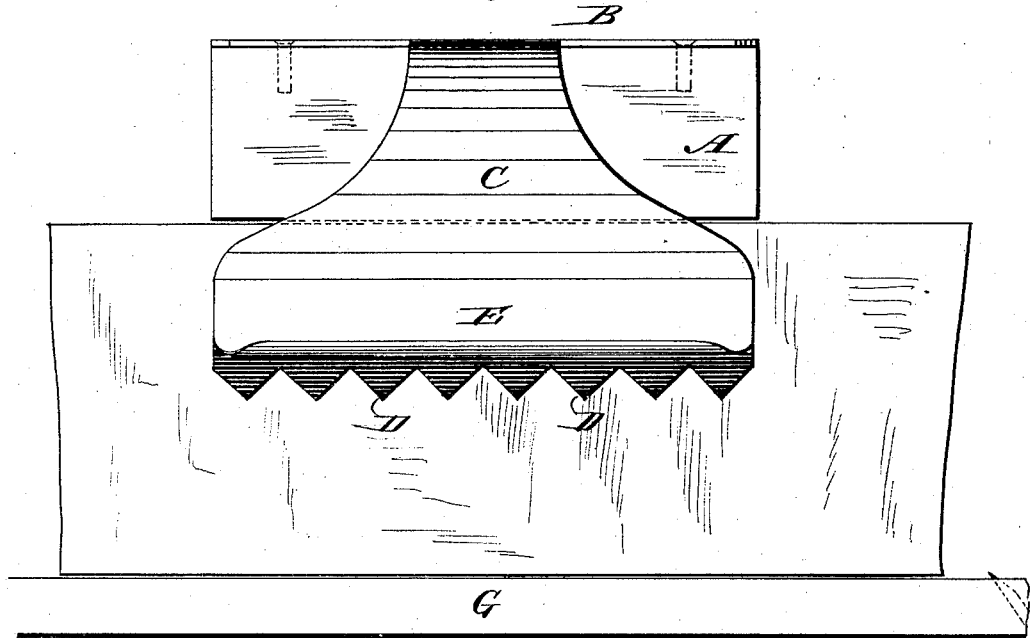
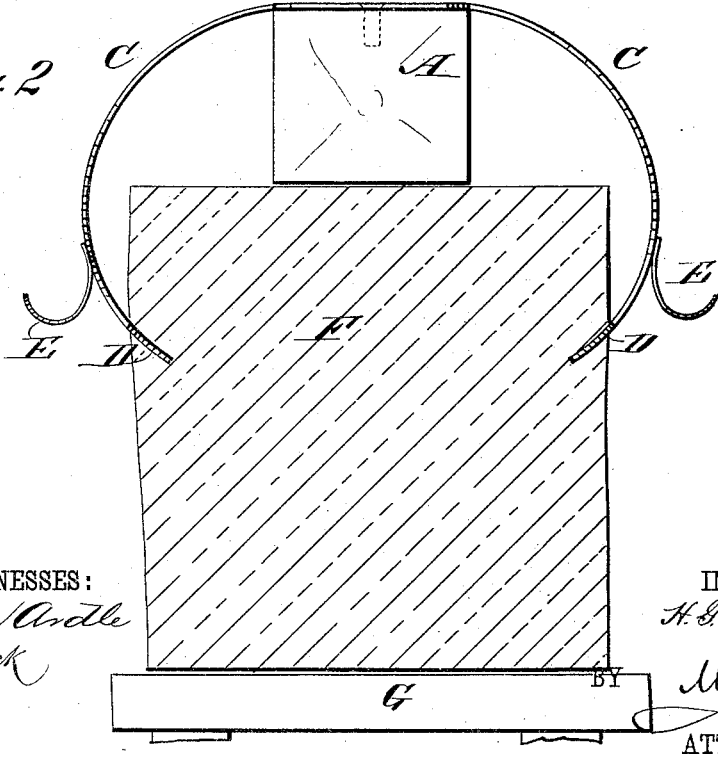
WITNESSES:
F. McArdle
C. Sedgwick
INVENTOR:
H. G. Carnell
BY Munn & Co.
ATTORNEYS.

UNITED STATES PATENT OFFICE.

HARRY G. CARNELL, OF DAYTON, OHIO.

GRIP FOR ICE-SHAVERS.

SPECIFICATION forming part of Letters Patent No. 320,624, dated June 23, 1885.

Application filed April 28, 1885. (Model.)

*To all whom it may concern:*

Be it known that I, HARRY G. CARNELL, of Dayton, in the county of Montgomery and State of Ohio, have invented a new and Improved Grip for Ice-Shavers, of which the following is a full, clear, and exact description.

The object of my invention is to provide a new and improved grip for holding a piece of ice while sliding it over an ice-planer to shave the ice into small chips for cooling beverages, such as soda-water, &c.

The invention consists in an ice-grip formed of a metal plate secured on a block and having two downwardly-curved jaws, which have teeth formed on their ends for gripping the block of ice placed between them.

Reference is to be had to the accompanying drawings, forming part of this specification, in which similar letters of reference indicate corresponding parts in both the figures.

Figure 1 is a side view of my improved ice-grip. Fig. 2 is a cross-sectional view of the same.

On the top of a block, A, of wood a spring-metal plate, B, is secured, which forms two curved prongs, C, extending downward and flared toward their ends, teeth D being formed on the enlarged edges of the prongs. Outwardly-curved guards or flanges E are formed on the outer sides of the prongs C, near their toothed edges.

The block A of wood is placed on the piece of ice F, the toothed edges of the prongs C being separated to admit the block of ice F between them. The spring-tension on the prongs forces the teeth D into the sides of the block of ice, whereby the grip is held securely on the block of ice. The hand is placed on the grip, the ends of the fingers resting on the guards E, and the block is placed upon the ice-planer G, on which the block of ice is moved to and fro to shave off the ice.

The grip can be used on blocks of ice of different sizes, as the prongs can be separated more or less.

The ice is held securely by the grip.

Having thus described my invention, what I claim as new, and desire to secure by Letters Patent, is—

1. An ice-grip formed of a spring-metal plate secured on a block and forming two prongs curved downward and toward each other at the sides of the block, and having teeth on their end edges, substantially as herein shown and described.

2. An ice-grip, formed of a spring-metal plate secured to a block and forming two side-prongs curved downward and toward each other at the sides of the block, which prongs have teeth formed in their ends and have guards or flanges on their outer sides near the toothed edges, substantially as herein shown and described.

HARRY G. CARNELL.

Witnesses:
   CHAS. LUTZENBERGER,
   J. A. PFANNER.